United States Patent
Chan et al.

(10) Patent No.: US 6,547,452 B1
(45) Date of Patent: Apr. 15, 2003

(54) ALIGNMENT SYSTEMS FOR SUBASSEMBLIES OF OVERMOLDED OPTOELECTRONIC MODULES

(75) Inventors: Benson Chan, Vestal, NY (US); Paul F. Fortier, Richelieu (CA); Francois M. Guindon, Stukely-Sud (CA); Glen W. Johnson, Yorktown Heights, NY (US); Martial A. Letourneau, Granby (CA); John H. Sherman, Lisle, NY (US); Real Tetreault, Granby (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/568,978

(22) Filed: May 11, 2000

(51) Int. Cl.[7] .................................................. G02B 6/36
(52) U.S. Cl. ............................ 385/88; 385/52; 385/134
(58) Field of Search ................................ 385/52, 88–94, 385/134

(56) References Cited

U.S. PATENT DOCUMENTS

| | | |
|---|---|---|
| 5,023,202 A | 6/1991 | Long et al. |
| 5,700,723 A | 12/1997 | Barber |
| 5,783,134 A | 7/1998 | Yabe et al. |
| 5,833,903 A | 11/1998 | Centotautz |
| 5,929,517 A | 7/1999 | Distefano et al. |
| 5,938,996 A | 8/1999 | Bianca et al. |
| 5,985,185 A | 11/1999 | Steijer et al. |
| 5,990,543 A | 11/1999 | Weaver et al. |
| 6,375,365 B1 * | 4/2002 | Chau .............................. 385/88 |

FOREIGN PATENT DOCUMENTS

| | | |
|---|---|---|
| DE | 4141413 A | 2/1993 |
| JP | 020222551 A | 5/1995 |

OTHER PUBLICATIONS

UK Search Report dated Sep. 26, 2002.

* cited by examiner

Primary Examiner—Lynn Field
Assistant Examiner—Son V. Nguyen
(74) Attorney, Agent, or Firm—Connolly Bove Lodge & Hutz LLP; A. J. Samodovitz; Larry J. Hume

(57) ABSTRACT

Alignment systems for optoelectronic modules with overmolded chip carriers include drilled or milled substrate corners for engaging dowel pins to precisely align the substrate in a mold for molding an overmold frame on the substrate. The overmold frame includes slot and trilobe holes for receiving retainer posts to precisely align a retainer assembly on the overmold frame. Cooperating standoff pads on the overmold frame and on the retainer assembly stabilize the assembly of these components and provide a precise gap for receiving an adhesive to permanently attach these two components. The retainer assembly carries optoelectronic components that include a flexible circuit, and a distal end portion of this flexible circuit and walls of a receiving cavity in the overmold frame have cooperating features for precisely aligning distal electrical leads of the flexible circuit with an array of electrical pads on the substrate. A permanent shroud on a proximate end portion of the flexible circuit protects and helps align proximate electrical leads with electrical pads on optic dies and their carriers.

12 Claims, 12 Drawing Sheets

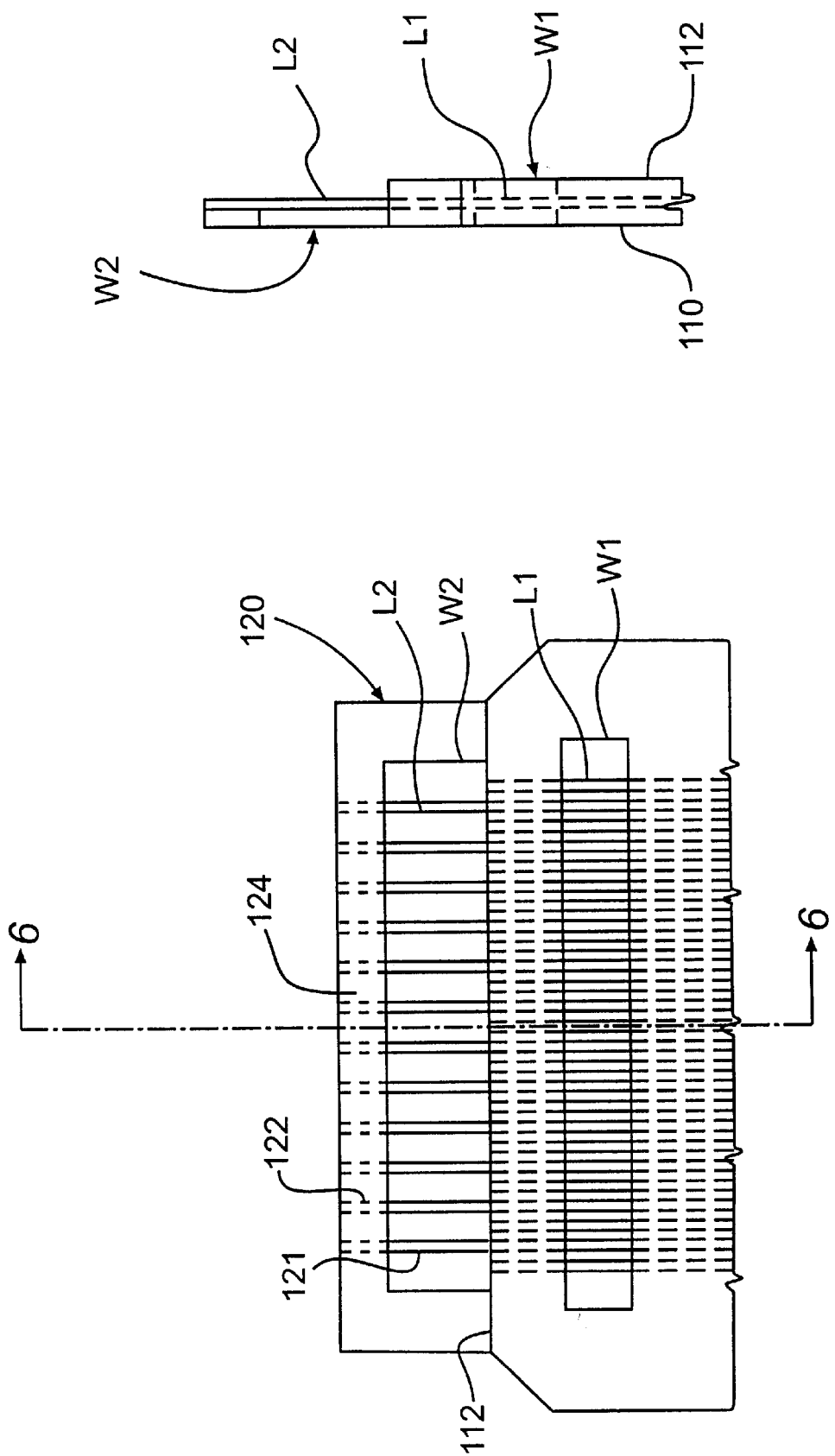

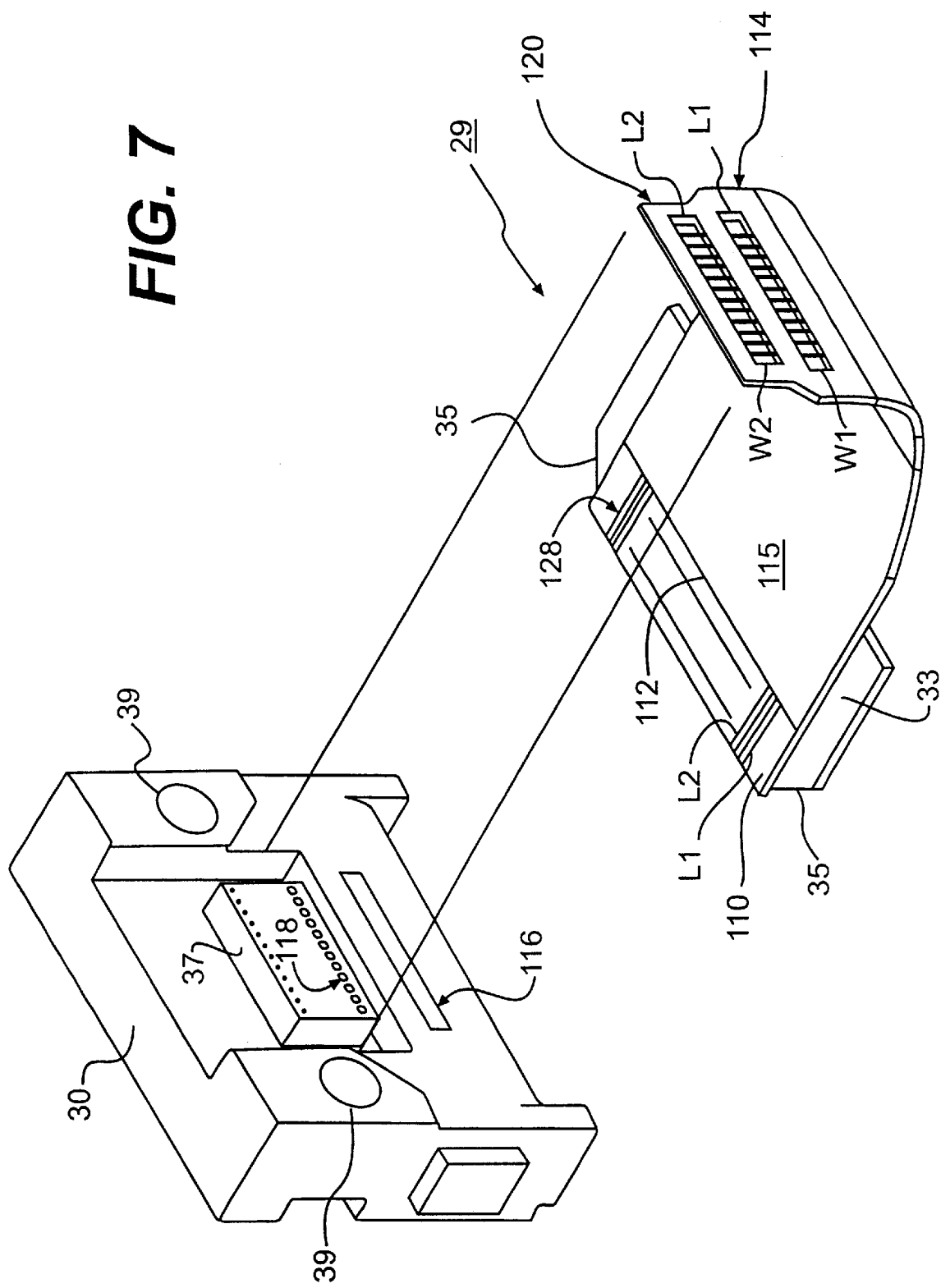

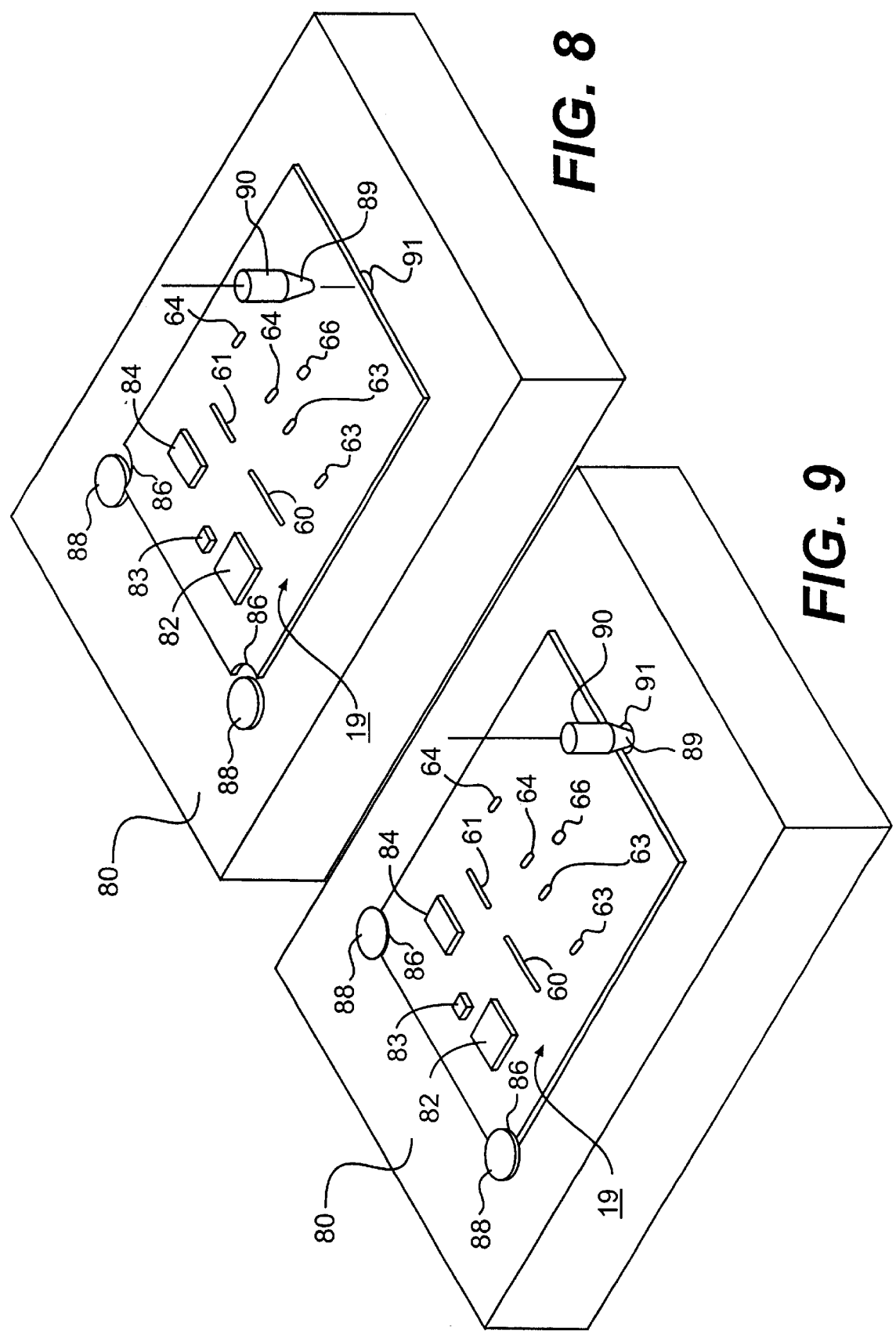

ALIGNMENT SYSTEMS FOR SUBASSEMBLIES OF OVERMOLDED OPTOELECTRONIC MODULES

TECHNICAL FIELD

The present invention relates to optoelectronic transceiver modules and, more particularly, to structures of and methods of making overmolded laminate and other subassemblies in a module for coupling a multiple channel fiber optic cable to a multiple channel Vertical Cavity Surface Emitting Laser (VCSEL) transmitter and to a multiple channel receiver comprising a transimpedance amplifier commonly referred to as a Preamplifier with Integrated Detector (PAID).

BACKGROUND OF THE INVENTION

An optoelectronic transceiver is the key component in a parallel fiber optic data link. One such transceiver is a modular package or module for coupling a multiple channel fiber optic cable to a multiple channel Vertical Cavity Surface Emitting Laser (VCSEL) and to a multiple channel receiver. The module consists of various components, including both CMOS and optoelectronic dies. It is designed to accept a single connector that has one receive and one transmit section and is mounted on the end of a dual 12-channel fiber optic ribbon cable. The transmit half of the module converts parallel electrical input signals into their corresponding parallel optical output signals through a laser driver and a Vertical Cavity Surface Emitting Laser (VCSEL) diode array. The receive half of the module converts parallel optical input signals into corresponding parallel electrical output signals by using a photo-detector and a transimpedance amplifier to convert the optical input signals to voltage signals. This amplifier is commonly referred to as a "PAID" (Preamplifier with Integrated Detector).

The optoelectronic transceiver module comprises two major building blocks. One is an overmolded laminate subassembly that incorporates electronic functions using standard manufacturing materials. The second is a retainer subassembly that incorporates optical and other components necessary to support the module's optoelectronic, optical and connector functions. The retainer subassembly includes both a receiver optical subassembly (ROSA) and a transmitter optical subassembly (TOSA). The module is assembled by mounting the retainer subassembly on the overmolded laminate subassembly and electrically connecting the two subassemblies. Finally, a heat sink and an EMI (Electromagnetic Interference) shield are attached.

A number of problems have been encountered in the assembly of the transceiver module and also in the manufacture of the overmolded laminate subassembly, the overmold frame of which is the main structural member of the module. The overmold frame (also referred to as the "overmold") protects the non-optoelectronic dies and their wirebonds, and needs to incorporate mechanical features to locate, align and hold in place other parts of the module.

Since the overmold is a key part of the module with respect to alignment of the other components, it is very important to keep a tight tolerance between the laminate board substrate and the overmold. In other words, components that are aligned with the overmold have interface contacts that must be aligned with corresponding interface contacts on the laminate board. For example, the flexible circuit (flex) connected to an optical die (transmitter or receiver) must be aligned in the cavity of the overmold for its leads to be electrically connected by wirebonds to corresponding pads on the laminate board. Lateral offsets between the flexible circuit leads and the bonding sites on the laminate may result from cumulative placement errors, such as retainer to overmold and overmold to laminate. Excessive offsets between bonding sites can adversely affect wirebond yields and process times, and create a high inductance electrical subsystem due to the longer wires and higher wire loops required to accommodate the lateral offsets.

SUMMARY OF THE INVENTION

The present invention provides improvements in positioning a laminate board or other substrate on a mold base to ensure proper alignment of the overmold frame when it is molded onto the substrate. Improved alignment features are also provided in the overmold frame to ensure that positioning of the retainer assembly and the flexible circuit mounted thereon is accurately achieved. These improvements are applicable to transmitter modules, receiver modules, and to combined transmitter and receiver (transceiver) modules.

Prior molding processes use outside edges of the laminate to locate it on the mold base, the tolerance of using the outside laminate edges being ±8 mils. The laminate edge is used because it is beyond the area on which the overmold frame is deposited and thereby avoids any interference with the flow of the molding composition.

To decrease the locating tolerance range from about ±8 mils to about ±2 mils, a pair of concave arcuate recesses, referred to as "mouse bites", are formed in the leading edge of the laminate, each mouse bite being positioned for abutting a corresponding alignment pin or other convex arc shaped feature on the mold base. The arcs of the mouse bites face in opposite directions and are preferably formed at opposite corners of the leading edge. However, the mouse bites may be located in spaced relation anywhere along the leading edge, and may even be created by opposing arcs within a single recess.

The arc of the mouse bite is drilled, milled or otherwise cut on a radius greater than the radius of the locating pin such that abutment between the pin and the mouse bite is along substantially a line of contact instead of a wide band of contact. Drilling or milling of the mouse bite arc is preferred because drilled or milled recesses provide a tolerance of ±2 mils. The overmold frame (also referred to as "the overmold") is therefore more accurately positioned relative to the contact interfaces on the laminate board (also referred to as "the laminate"). Thus, other components subsequently assembled on the overmold and aligned to its features will, in turn, be more accurately placed relative to the laminate board features. The mouse bites permit a laminate handling process that is easy and economical, and that reduces yield losses otherwise resulting from too great a tolerance between the overmold frame and the laminate board.

The invention also provides improvements in locating, positioning, and stabilizing the retainer assembly on a platform of the overmold. In conventional designs, a pair of standard holes in the overmold platform is mated with a pair of cylindrical posts projecting from the bottom of the main retainer piece (also referred to as "the retainer"). However, difficulties have been encountered with such standard holes in mating the posts to the holes, in achieving a proper interference fit to frictionally secure the retainer to the overmold, and in inserting the posts into holes containing air and/or liquid adhesive when the overmold platform surface is coated with a layer of epoxy adhesive for permanent attachment of the retainer. In the latter case, the air and/or adhesive is not able to escape from the holes as necessary to allow the two parts to mate correctly.

The present invention provides an elongated hole or slot (slot hole) for receiving one post and a triangular-shaped hole (trilobe hole) for receiving the other post of the retainer assembly. Both the slot and the trilobe holes provide vent passageways in the form of free spaces between the hole walls and the post through which excess adhesive and/or air may escape as the posts enter the holes. The trilobe hole has additional advantages in that it provides three bands of contact between the corresponding post and the hole walls, each of the three sidewalls of the trilobe hole providing a narrow band of contact parallel to the axis of the post.

In addition, the slot hole contacts its post only along two narrow bands of contact, one on each opposing wall. The slot hole therefore provides sufficient freedom of movement of the retainer in the x-y plane for the contact pressure along the three narrow bands of contact in the trilobe hole to be substantially equal. The contact between the posts and the sidewalls of the slot and trilobe holes are preferably along narrow bands instead of along substantially a line because the diameters of the posts are chosen to provide an interference fit, such that a band of contact is created along each sidewall of the holes when a small arc of the post perimeter extending parallel to central axes of the posts compresses the overmold material, which preferably is a molded resin composition. Each of these bands of contact is substantially perpendicular to the plane of the laminate, is preferably about 25 to about 250 microns, more preferably about 100 microns, in transverse width, and have a length of preferably about 0.25 mm to about 0.75 mm, more preferably about 0.4 mm. The retainer posts are preferably cylindrical (round in cross-section), but may have other cross-sectional shapes provided that the shape selected gives equivalent bands of contact with the slot and trilobe holes. The posts have a diameter of preferably about 1.25 to about 2.5 mm, more preferably about 2.0 mm, and a length of preferably about 1.0 to about 2.5 mm, more preferably about 1.75 mm.

The lateral engagements between the retainer posts and the slot hole and the trilobe hole firmly fix the retainer assembly from lateral movement in the x-y plane (eliminating two degrees of freedom) and from rotation around the z-axis (eliminating a third degree of freedom), and the frictional engagements between these holes and the corresponding retainer posts restrain movement of the retainer along the z-axis (eliminating a fourth degree of freedom). The engagements between the retainer posts and the slot hole and trilobe hole also tend to eliminate the two remaining degrees of freedom, namely, rotation of the retainer assembly around the x-axis and the y-axis. However, to positively eliminate these latter two degrees of freedom, a set of three standoff pads projecting from the underside of the retainer are arranged to abut a set of three standoff pads projecting from the platform of the overmold, each set of pads preferably being arranged with one pad at the corner of an imaginary isosceles triangle for maximum stability. The abutting standoff pads also provide a gap of substantially uniform width that is filled with the adhesive, preferably an epoxy resin, for permanently securing the underside of the retainer to the surface of the platform of the overmold.

The present invention also provides a simplification of the TAB bonding process for bonding proximate leads of the flex to the optical dies and their carriers. Conventional integrated flex cable has exposed leads cantilevered off of the flex and these leads must be TAB bonded to the optical dies and their carriers. However, the cantilevered leads may be damaged during shipment significantly complicating the TAB bonding process. One way to protect the leads from such damage is to provide a protective shroud that must be removed prior to assembly and thereby requires an additional process step. The present invention provides a shroud with windows that leave portions of the leads exposed for attachment to each die and carrier, which eliminates the need to remove a protective shroud and thereby avoids this additional process step. This, in turn, improves yields and cycle times and reduces assembly and equipment costs.

Adjacent to the overmold platform for supporting the retainer is an open cavity for receiving the flexible circuit and optical die carrier portions of the receiver and transmitter optic assemblies mounted on and cantilevered from the retainer. The optical coupler portions of these optic assemblies are inserted within and held by the retainer. The overmold of the invention provides features for precisely aligning distal leads of the flex with the receiver and transmitter terminal pad arrays on the laminate board. These alignment features are part of the overmold wall that defines the open cavity providing access to the terminal pad arrays and also to grounding pads for the die carriers of the two optical assemblies. The access provided by the open cavity permits the flex leads to be connected to the terminal pads by wirebonds. The alignment features comprise portions of the cavity wall that are perpendicular to the laminate and are slanted at an angle, preferably about 45°, relative to a central axis of the flex. Corresponding beveled edges are provided on a stiffener pre-attached to a distal portion of each flex, and the abutment or interfacing between the beveled edges of the stiffener and the slanted portions of the cavity wall precisely locate the distal leads of the flex over corresponding pads of the terminal pad arrays.

BRIEF DESCRIPTION OF THE DRAWINGS

The structures, methods and operation of the invention may be further understood by reference to the Detailed Description below taken in conjunction with the accompanying drawings, in which:

FIG. 5 is an enlarged view of the detail identified by the broken line circle 5 in FIG. 4;

FIG. 6 is a cross-sectional view of the proximate end of the flexible circuit, as taken along line 6—6 of FIG. 5;

FIG. 7 is a top perspective exploded view of the die carrier and flex of one of the fiber optic assemblies of FIGS. 1–3;

FIG. 8 is a perspective view of a laminate board out of position but resting on a mold base;

FIG. 9 is a perspective view with the laminate board moved into aligned position on the mold base for receiving the overmold;

DETAILED DESCRIPTION OF THE PREFERRED EMBODIMENTS

Figure 1:
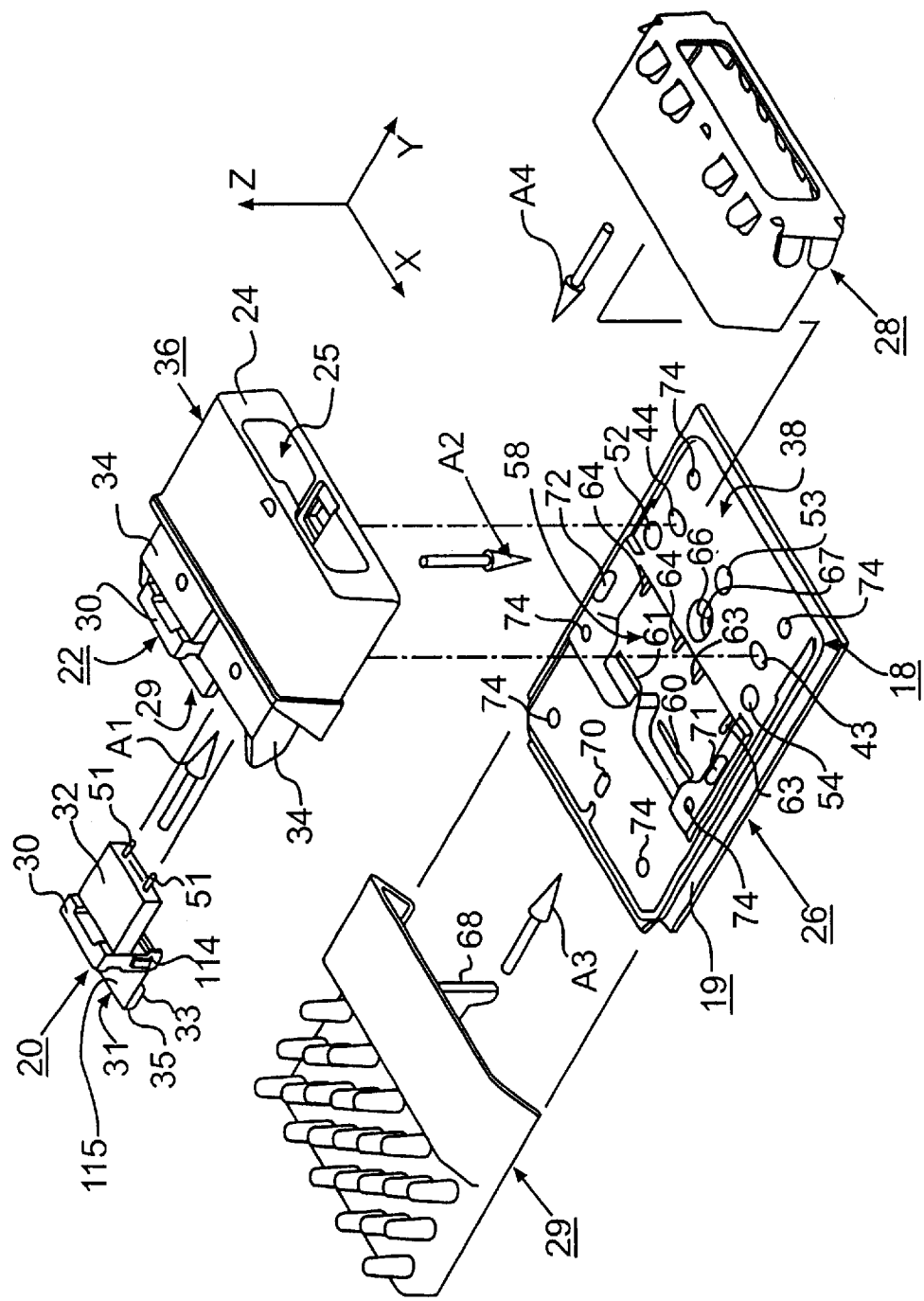
FIG. 1 is an exploded view showing in perspective the individual components and subassemblies that are secured together to form the optoelectronic module of the invention.

Referring now to FIG. 1 of the drawings, there is shown an exploded view of a parallel optoelectronic module having a receiver optic assembly 20, a transmitter optic assembly 22, a retainer 24, an overmold assembly 26, a heat sink 27, and a EMI (Electromagnetic Interference) shield 28. The overmold assembly 26 comprises an overmold frame 18 on a laminate board 19. Each optic assembly includes a die carrier 30, a flexible circuit (flex 29, 31), and an optical coupler 32, and is received and held in a corresponding receptacle piece 34 forming part of a retainer 24. The retainer 24 also has a receptacle 25 for receiving a single connector (not shown), having one receive and one transmit section, that is mounted on the end of a dual 12 channel fiber optic ribbon cable.

Figure 2:
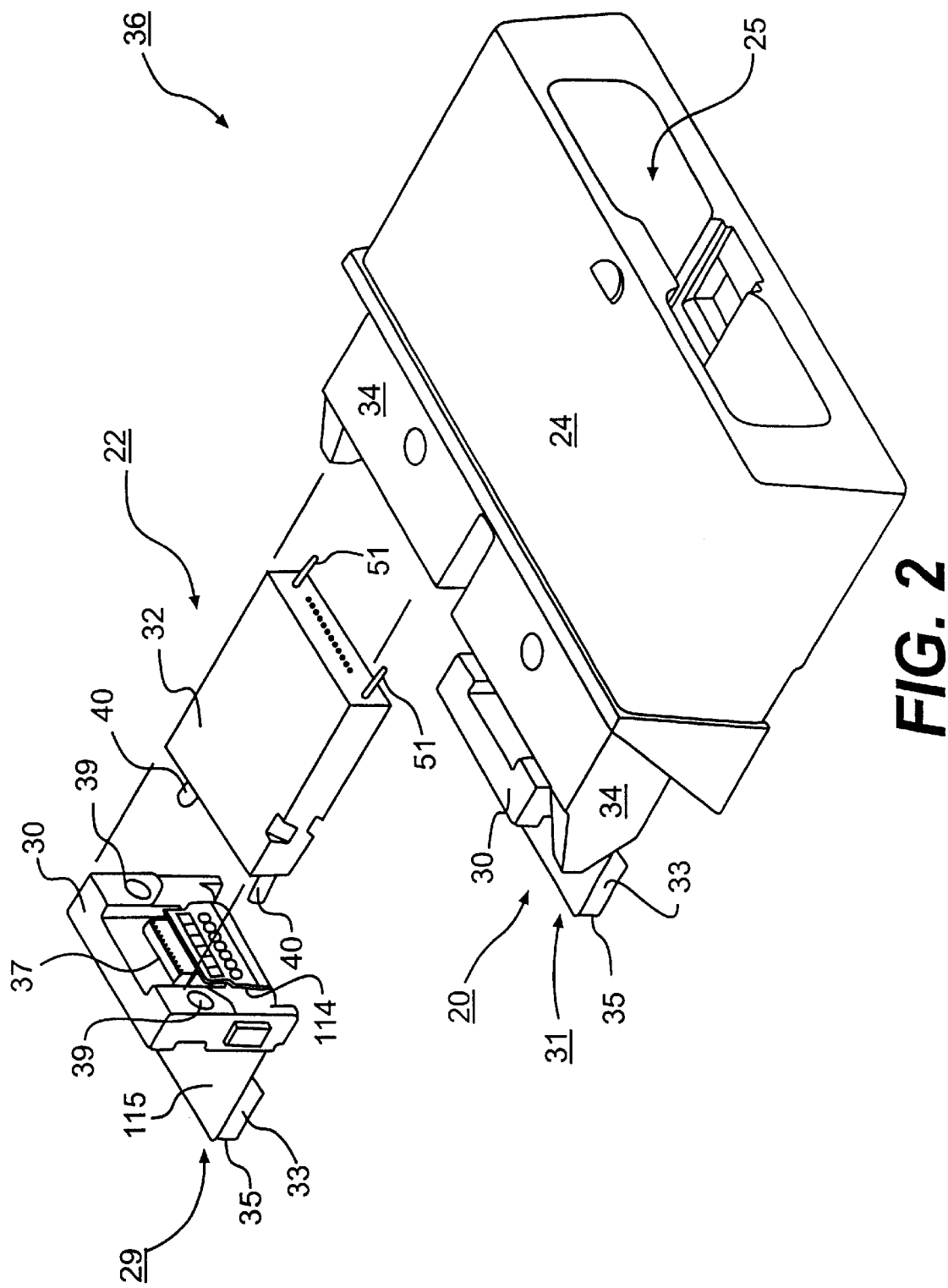
FIG. 2 is a top perspective and partially exploded view of a transmitter optic assembly comprising an optical coupler and a carrier supporting an optical die and a flexible circuit.
Figure 3:
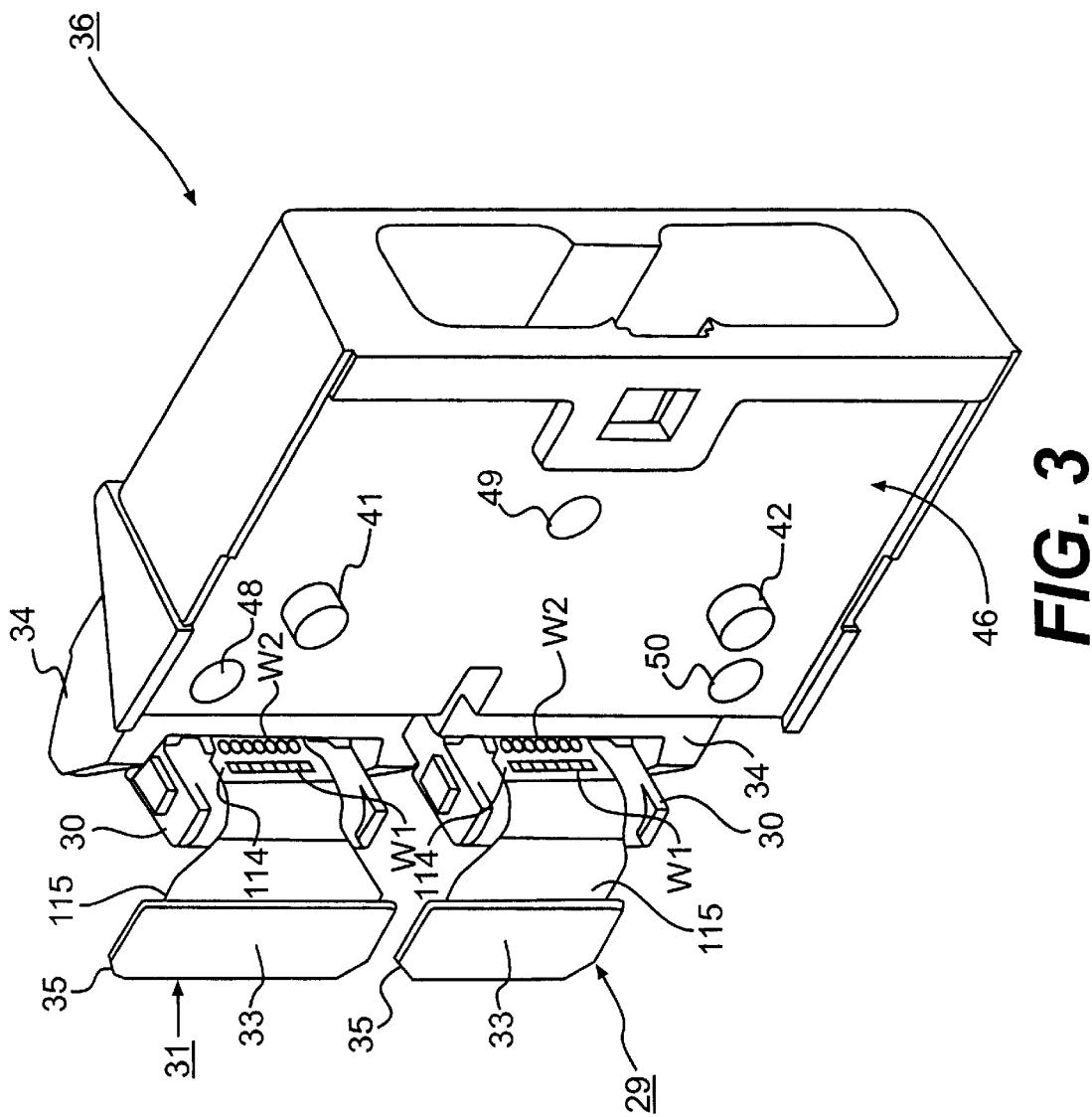
FIG. 3 is a bottom perspective view of the retainer supporting the fiber optic assemblies of both the receiver and the transmitter.

As shown in FIGS. 2 and 3, the flex of each optical assembly is bent by about 90° to form a laminate end portion 115 and an upturned optical portion 114 secured by an adhesive to the carrier 30. The distal or laminate end portion of the flex includes a stiffener member 33 having beveled distal corners 35, 35 at opposite sides, the purpose of which is explained below. A transmitter optical die 37 is also mounted on the carrier 30 of the optical assembly 22, and a receiver optical die (not shown) is mounted on the carrier 30 of optical assembly 20. Carrier 30 includes two passages 39, 39 for mating with forward alignment pins 40, 40 of optical coupler 32, the forward alignment pins 40, 40 being similar to rear alignment pins 51, 51 (FIG. 2) for engaging corresponding passages (not shown) in the receptacle piece 34 formed as an integral part of retainer 24. As shown in FIGS. 2, 3 and 7, the flex 29 is bent at right angles for attachment to the die carrier 30 by an adhesive. The flexible circuit is used for electrically connecting pads on the laminate surface to a contact area on the carrier and to pads on the optoelectronic dies, which are oriented perpendicular to the laminate.

As shown in FIGS. 4–7, the flexible circuits 29 and 31 have a first set of leads L1 and a second set of leads L2 deposited and etched on a base layer 110, preferably of a polyimide material, and these leads are protected by a cover layer 112, also preferably of a polyimide material. The flexes 29, 31 have an optical end portion 114 and a laminate end portion 115. At the optical end 114 of the flex, TAB (Tape Automated Bonding) bonds are used for connection of the leads L1 to a bonding area 116 in the carrier 30 and for connection of the leads L2 to an array 118 of conductive pads on the optoelectronic dies (FIG. 7). A first window W1 is provided through the base layer 110 and the cover layer 112 to expose the leads L1 for attachment to the bonding area 116 of the carrier. The ends of a C-shaped shroud 120 are integrally formed or bonded to the ends of the base layer 110 and/or the cover layer 112 to form a second window W2 for exposing end portions 121 of the second set of leads L2 for connection to the conductive pads of the die pad array 118. The tips 122 of the second set of leads L2 are formed on the base 124 of the shroud so that the end portions 121 and tips 122 are protected from damage both during shipment and during the connection process (FIGS. 5 and 6). Since the second set of leads L2 are connected to the die array of pads through the window W2, the connection of the leads to the pads is made without removal of the shroud 120, thereby avoiding the extra process step required for removal of a completely encapsulating shroud.

In addition, in the laminate end portion 115 of the flexible circuit are an array of large pads 126 that provide landing sites for a test probe array. The pads 126 are used during an optical alignment and electrical test process to ensure proper alignment of the optoelectronic laser die to the carrier, of the flexible circuit to the laser die and of the carrier to the optical coupler mounted in the retainer. After testing is completed, an end section of end portion 115 beyond the broken line 127 is cut off and discarded. The solid line 129 (FIG. 4) represents the distal end of cover layer 112, beyond which a section 128 of each of the leads L1 and L2 is exposed for wirebonding to one of the laminate pad arrays 60 and 61. Although the portions of leads L1 and L2 inboard of line 129 are covered by layer 112, these portions are not shown as broken lines in FIG. 4 for clarity. The end portion 115 also includes two alignment holes 130, 130 for aligning the stiffener 33 during its attachment to the flex by an adhesive. After the optical assemblies are inserted in the retainer, the resulting composite is referred to as the retainer assembly 36.

Referring now to FIGS. 1 and 3, the module is assembled by first inserting the two optical assemblies 20 and 22 into the retainer 24, as indicated by arrow A1, then placing the resulting retainer assembly 36 on a supporting platform 38 of the overmold by fitting round posts 41 and 42, respectively, into a slot hole 43 and a trilobe hole 44 in the overmold platform 38. During assembly, retainer post 41 is press fitted into slot hole 43 and retainer post 42 is press fitted into trilobe hole 44. The ends of retainer posts 41 and 42 and the entrance openings of slot hole 43 and trilobe hole 44 are preferably beveled to guide insertion of each post into its corresponding hole.

Figure 14:
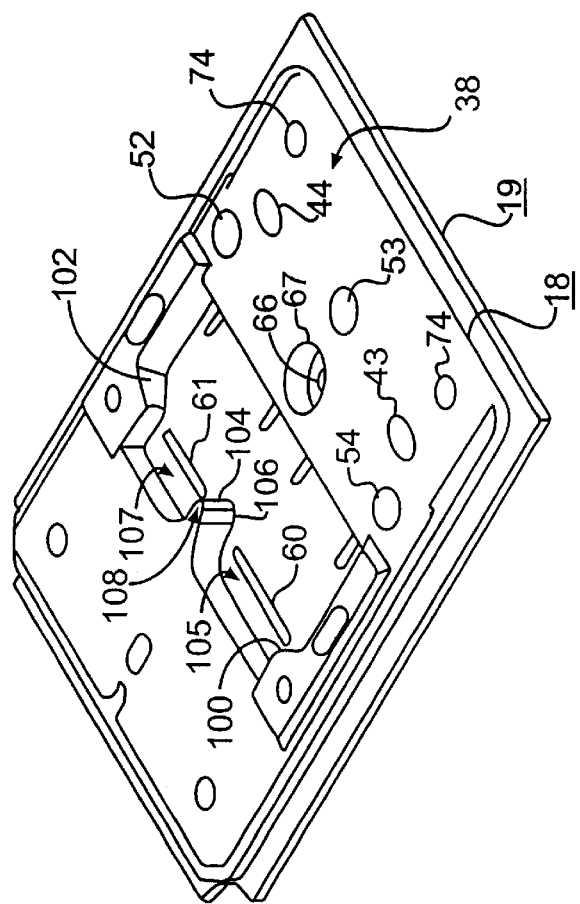
FIG. 14 is a perspective view of the overmold frame, as created on the laminate board by the molding operation illustrated in FIGS. 12 and 13.
Figure 15:
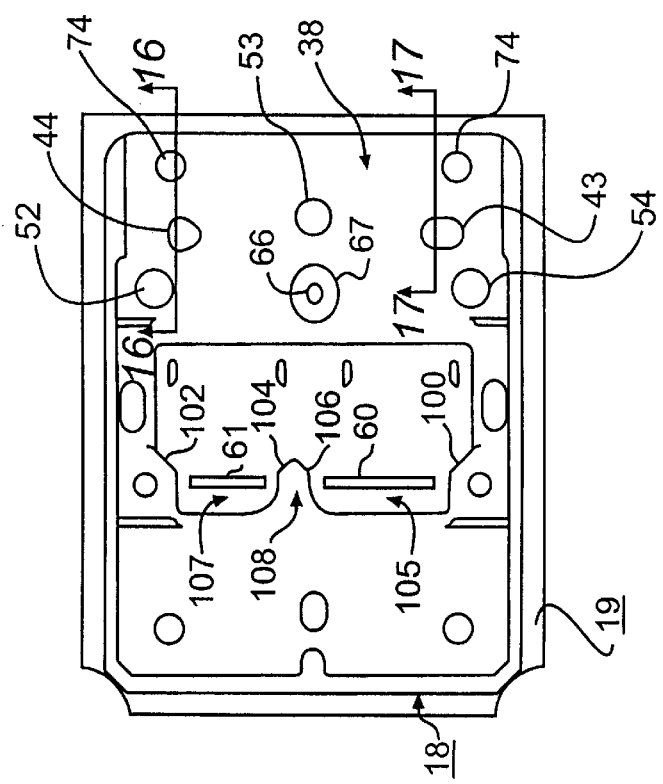
FIG. 15 is a plan view of the overmold frame and laminate board of FIG. 14.

Press fitting is provided by post 41 having a slightly greater diameter than the width of slot hole 43, and post 42 having a diameter slightly greater than that sufficient to simultaneously contact each of the three sidewalls of the trilobe hole 44, which is referred to as a "trilobe" hole because it has a triangular cross section as shown in FIG. 1 and more clearly in FIGS. 14 and 15. By "press fit" is meant an interference fit such that the retainer posts and the abutting hole walls compress each other to form a narrow band of frictional contact extending axially along the post surface. Both the posts and the overmold are preferably made of a hard but compressable synthetic resin. Thus, the interference fit between the cylindrical post 41 and the opposing sides of slot hole 43 provides two (2) narrow bands of frictional contact, and the interference fit between the cylindrical post 42 and the sidewalls of the trilobe hole 44 provides three (3) narrow bands of frictional contact. Each band of contact has a width preferably in the range of about 25 to about 250 microns, more preferably about 100 microns, and a length preferably in the range of about 0.25 to about 0.75 mm, more preferably about 0.4 mm. The posts 41 and 42 have a projecting length of preferably about 1.0 to about 2.5 mm, more preferably about 1.75 mm, and a diameter preferably in the range of about 1.25 to about 2.5 mm, more preferably about 2.0 mm.

These bands of frictional engagement firmly hold the retainer assembly 36 in position on the overmold platform 38 during curing of a liquid adhesive provided between the underside 46 of the retainer assembly 36 and the surface of overmold platform 38. The resulting adhesive layer between the retainer surface 46 and the platform surface fills a gap having a uniform width established by firm abutment between three triangularly spaced standoff pads 48, 49 and 50 projecting from the underside 46 of retainer assembly 36 and three corresponding triangularly spaced standoff pads 52, 53 and 54 projecting from the surface of overmold platform 38.

Referring now to the x, y and z axes shown in FIG. 1, the cooperation between retainer pads 48, 49, and 50 and overmold pads 52, 53, and 54 stabilizes the retainer assembly 36 on the overmold 26 by positively eliminating two degrees of freedom, namely, rotation around the x-axis and rotation around the y-axis. The other four degrees of freedom are also eliminated in that movement along the x and y axes and rotation around the z-axis are prevented by the posts within the holes, and movement along the z-axis is restrained by the frictional engagements previously described between retainer posts 41 and 42 and overmold slot hole 43 and trilobe hole 44. Thus, the retainer assembly 36 is firmly held in a precise and stable position on the overmold frame 26 during the process of curing the adhesive that thereafter permanently fixes the retainer assembly 36 to the overmold frame 26, and thereby to laminate board 19.

Figure 4:
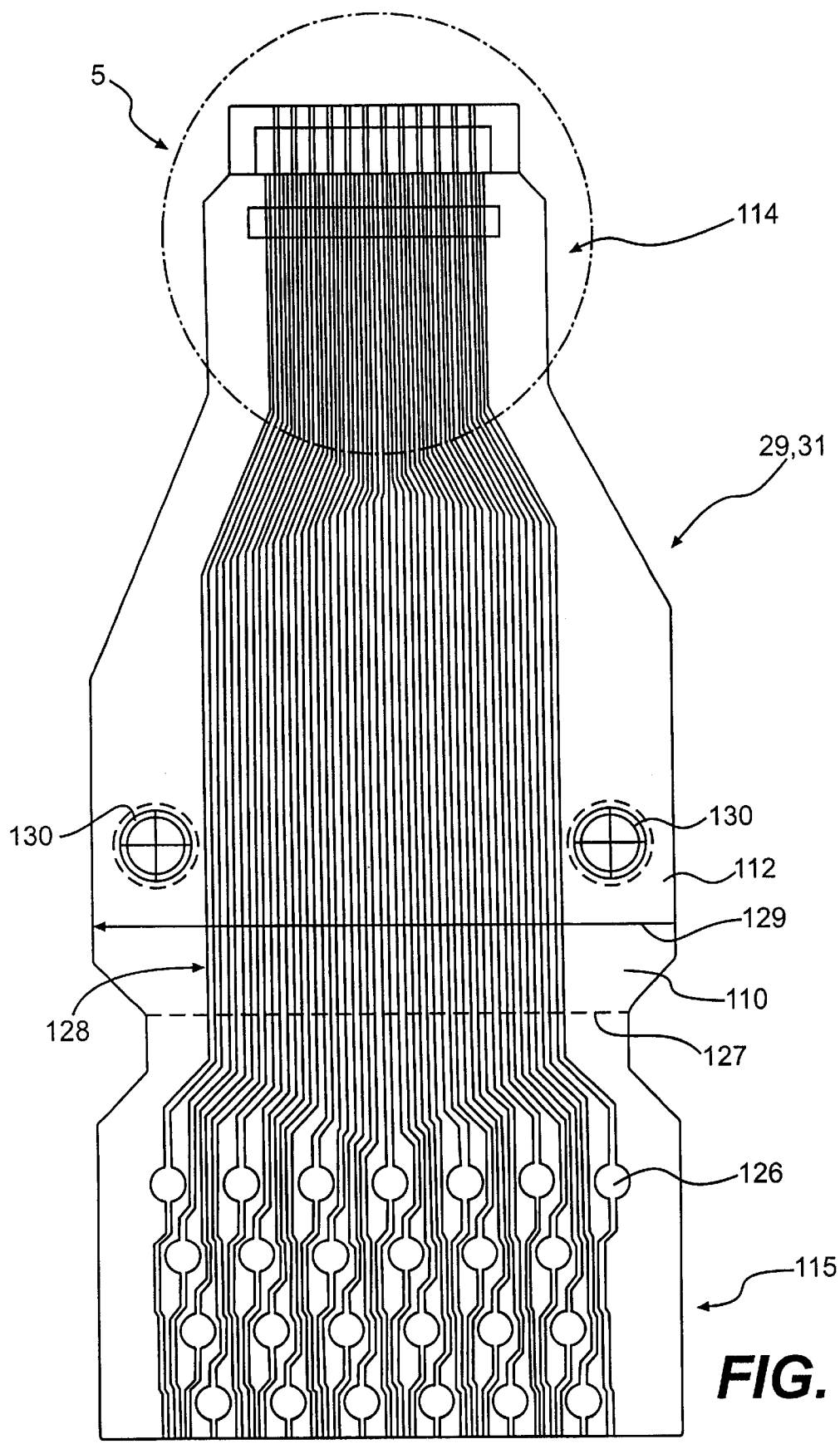
FIG. 4 is a plan view of one of the flexible circuits before it is bent and attached to a carrier as shown in FIGS. 1–3.
Figure 11:
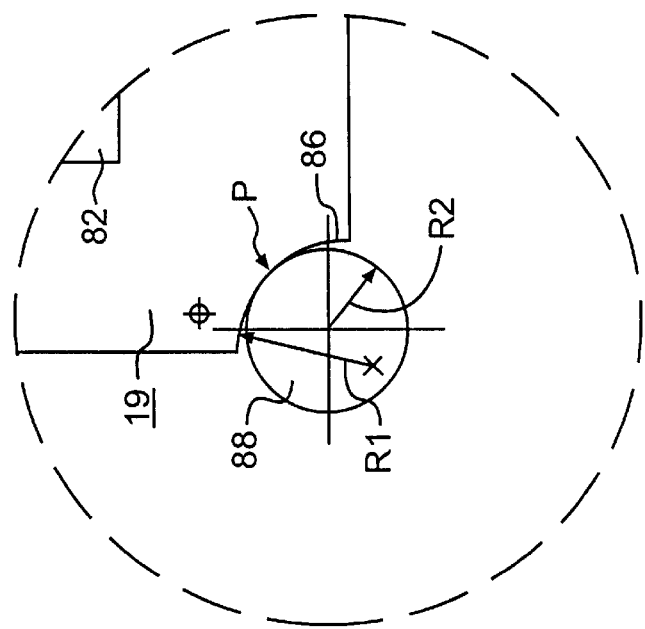
FIG. 11 is an enlarged view of the detail identified by the broken line circle 11 in FIG. 8.
Figure 10:
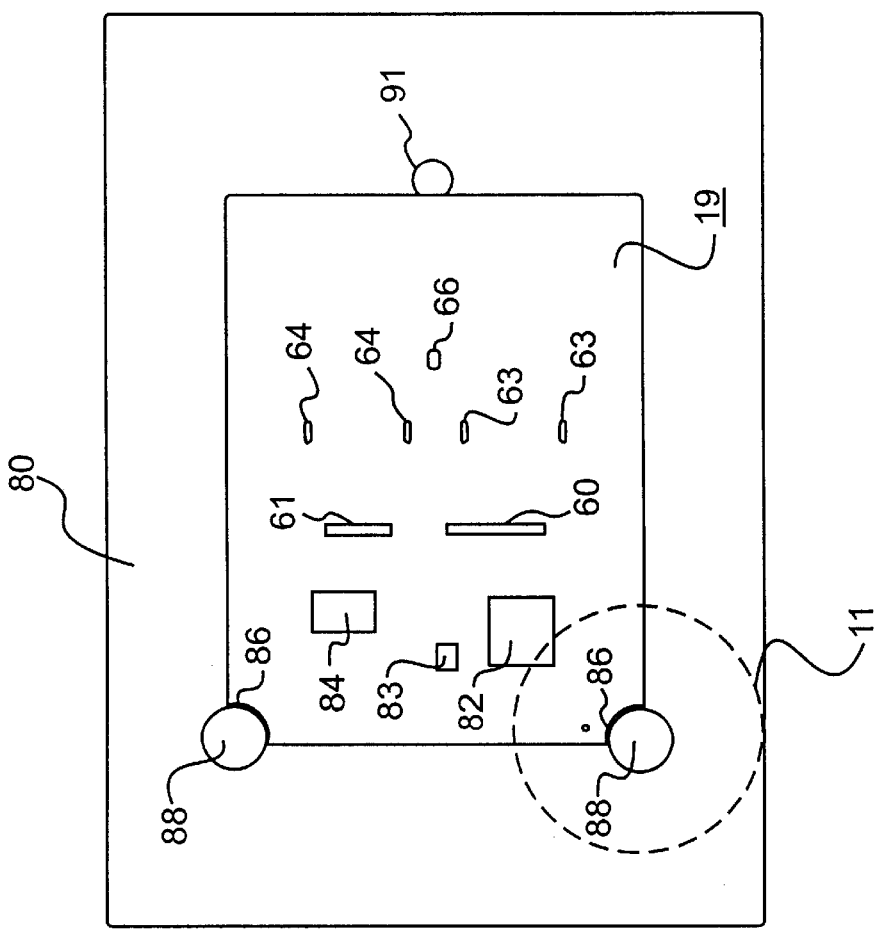
FIG. 10 is a plan view showing the laminate board in aligned position on the mold base corresponding to the position shown in FIG. 9.

After the retainer assembly 36 is permanently affixed to the overmold frame, a plurality of leads 128 extending along the laminate end portion 115 of flex 31 between broken line 127 and solid line 129, as shown in FIG. 4, are wirebonded to a plurality of pads in two terminal pad arrays on the portion of the laminate surface exposed by the overmold cavity 58, a pad array 60 being provided for the flex leads of the receiver optic assembly 20 and a pad array 61 being provided for the flex leads of the transmitter optic assembly 22. Also exposed on the laminate surface in the cavity 58 are two grounding pads 63, 63 for the die carrier 30 of the receiver assembly, and two grounding pads 64, 64 for the die carrier 30 of the transmitter optic assembly 22. The laminate also includes a grounding pad 66 exposed at the bottom of an overmold well 67 for grounding a web 68 projecting downwardly from the heat sink 27. The overmold frame 18 also includes three additional standoff pads 70, 71 and 72 arranged to cooperate with corresponding standoff pads (not shown) on the underside of the heat sink 27. As shown in FIG. 1, the overmold frame may further include circular areas 74 positioned to be engaged by mold ejection pins for freeing the overmold assembly from the molding apparatus upon completion of the molding operation.

As readily apparent from the foregoing description of the assembly of the parallel optoelectronic module, it is extremely important that the overmold frame 18 be positioned precisely on the laminate board 19 so that each flex lead will be in close proximity to its corresponding terminal pad on the laminate board, in order to minimize the length of the wirebond required to attach the lead to the pad. Therefore, the present invention also provides a method of precisely and accurately positioning the laminate board in the overmolding apparatus so that the overmold frame, which is integrally molded thereon by the overmolding operation, is correctly aligned with the features of the laminate board. The board positioning means and related molding apparatus and operation are described below.

Referring now to FIGS. 8–13, there is shown a mold base 80 on which rests the laminate board 19 having three wirebond dies (electronic chips) 82, 83 and 84, which become completely encapsulated by the overmold frame 18 (FIG. 1) during the subsequent molding operation. At the left end of the laminate board relative to these figures are a pair of concave recesses forming arcuate corners, referred to herein as "mouse bites" 86, 86, for engaging a corresponding pair of alignment pins 88, 88 or other convex arc shaped features on mold base 80.

Figure 12:
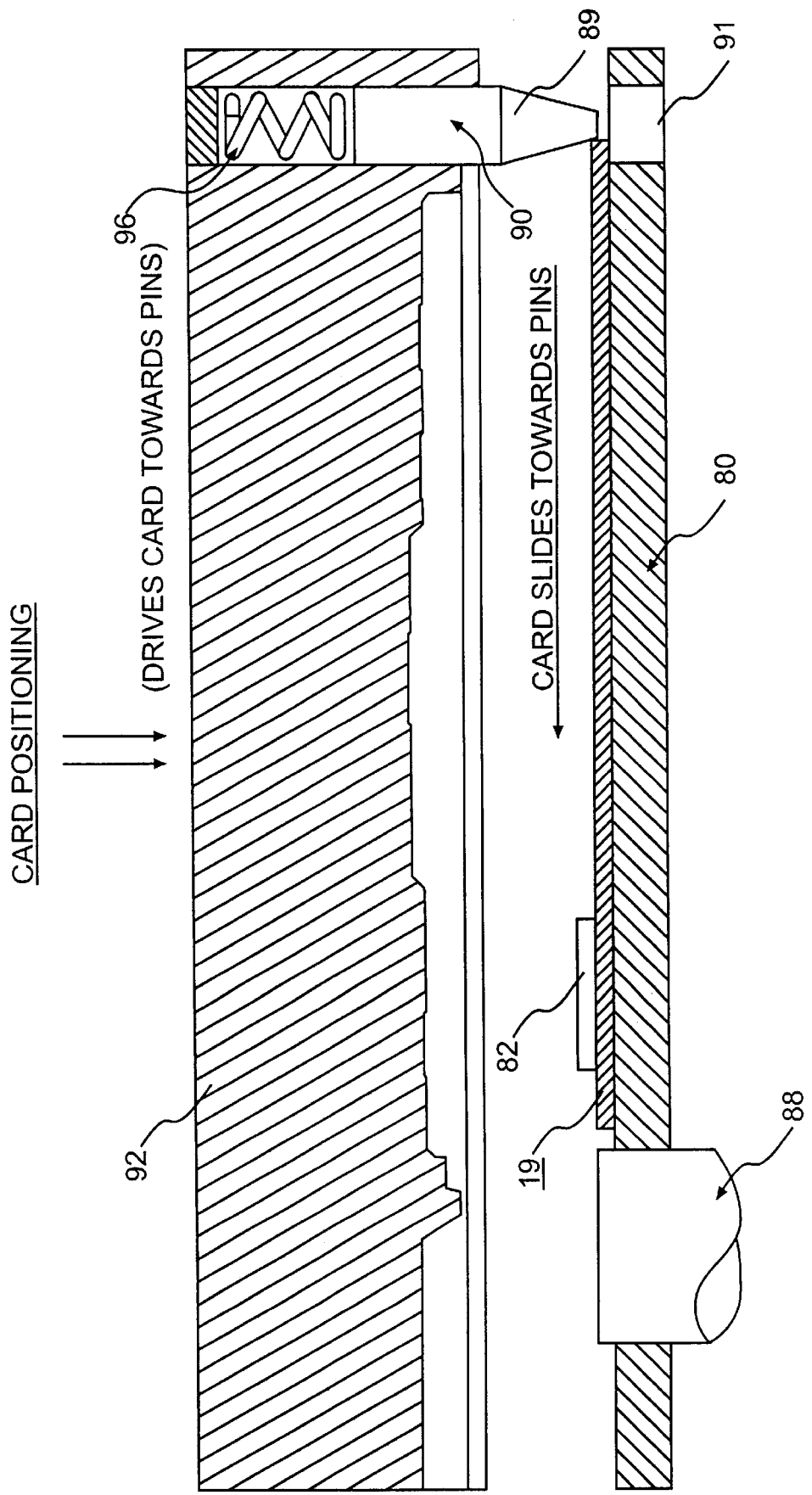
FIG. 12 is an elevational side view illustrating diagrammatically the position of the mold top piece when the laminate board is out of position as shown in FIG. 8.
Figure 13:
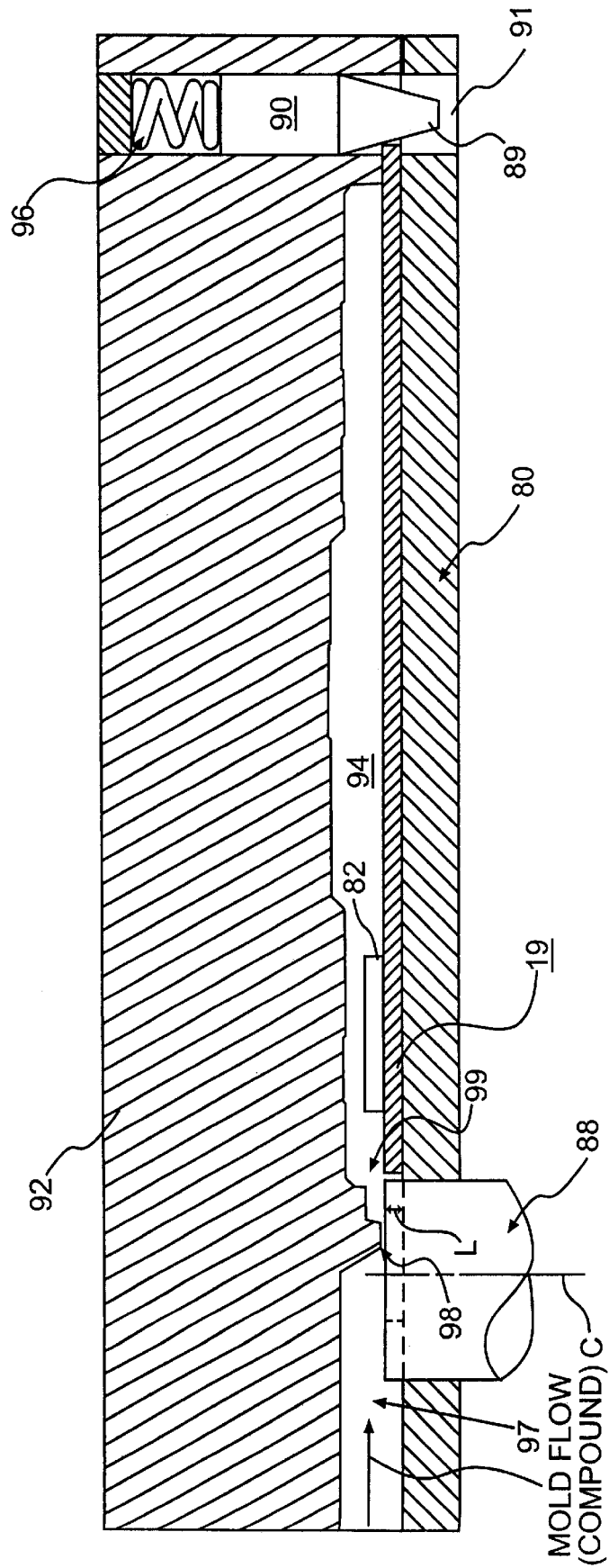
FIG. 13 is an elevational side view illustrating diagrammatically the position of the top mold piece when the mold is closed and a feature of the mold top piece moves the laminate board into the position shown in FIG. 9.

As shown in FIGS. 9, 12, and 13, a tapered end surface 89 on a locator plunger 90 engages the right edge of the laminate to move the mouse bites 86, 86 of the laminate into abutment with alignment pins 88, 88 as the top mold half 92 moves down against the mold base 80 to seal the mold cavity 94. As shown best in FIGS. 8 and 9, the concave arc of each mouse bite 86 is formed on a radius R1 that is substantially greater than the radius R2 of the corresponding alignment pin 88. The radius R1 is preferably the radius of a cut made by a drill or milling cutter used to create the arcuate mouse bite by drilling or milling out a corner of the leading edge of the laminate. Since drilled or milled holes can be kept to a tolerance of ±2 mils, this reduces the alignment tolerance of the overmold, from the usual ±8 mils achievable if a mold feature directly engages the leading edge of the laminate, to a tolerance of ±2 mils, i.e., a saving of ±6 mils over the usual leading edge alignment techniques. This difference in radii provides contact between the laminate board and the alignment pins only along a line of contact parallel to the central axis C of the alignment pin, this line of contact being represented by the double-ended arrow L in FIG. 13 and occurring at the abutment point P shown in FIG. 11 at substantially the mid-point of the arc of the mouse bite 86. The line of contact L also serves as a seal to prevent leakage of the molding composition around pins 88, 88.

The plunger 90 is biased downward by a coil spring 96 so as to bias the mouse bites 86, 86 against the alignment pins 88, 88, and also to avoid excessive pressure that might damage the trailing edge of the laminate 19 as it is engaged by the tapered surface 89 of the plunger. An aperture 91 is provided in the mold base 80 for receiving the tip of the plunger 90 as it moves downward past the laminate 19 as shown in FIG. 13.

After the mold top and the mold base are brought together to close the mold, as shown in FIG. 13, the synthetic resin composition from which the overmold frame is made is introduced into the mold cavity 94 through an inlet passage 97 and a gate 98 at the cavity entrance 99, thereby fully encapsulating the wirebond chips, only chip 82 being shown in FIGS. 12 and 13. The mold top 94 also includes a depending form (not shown) that abuts the laminate surface around an area corresponding to the overmold cavity 58 so as to exclude the resin composition from this area and thereby form the overmold cavity 58, which leaves exposed the terminal pad arrays 60 and 61 and the die carrier grounding pads 63, 63 and 64, 64. Other depending projections (not shown) form slot hole 43, trilobe hole 44, and pad well 67. Inserts are also provided and positioned to form the standoff pads 52, 53, 54, 70, 71, and 72 that are embedded in the overmold frame as previously described.

Figure 17:
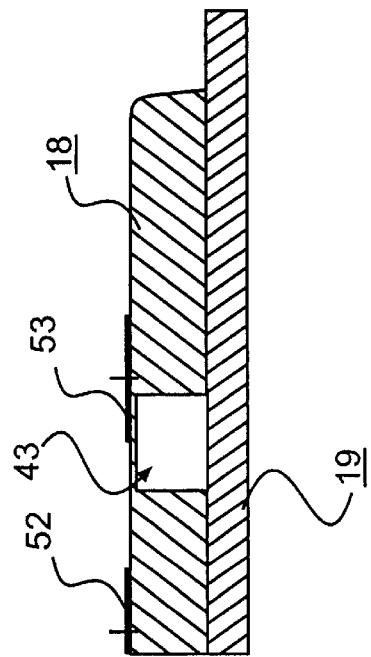
Figure 16:
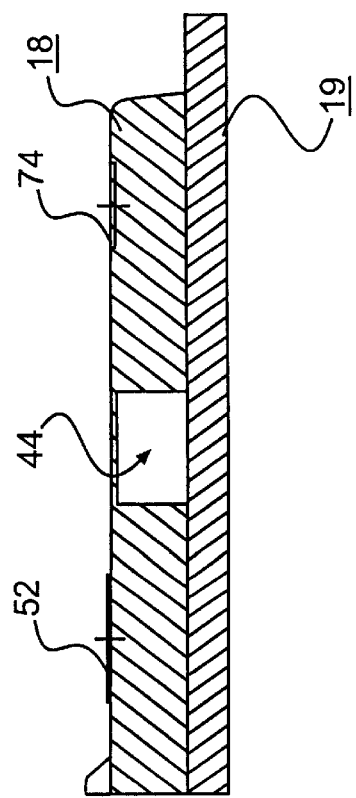
FIG. 16 is a cross-sectional view of a portion of the overmold and laminate board, as taken along line 16—16 of FIG. 15; and, FIG. 17 is a cross-sectional view of a portion of the overmold and laminate board, as taken along line 17—17 of FIG. 15.

The finished overmold product is illustrated in FIGS. 14 and 15. The cross-section shown in FIG. 16 further illustrates, in cross section, the trilobe post hole 44 in the overmold, the standoff pad 52, and a nearby mold ejection pin area 74. FIG. 17 further illustrates in cross section the overmold slot 43, the standoff pad 53, and a portion of the standoff pad 52.

The stiffener 33 (FIG. 3) is preferably made of aluminum and is attached to the laminate end portion 115 of the flexible circuit inboard of where the cover layer 112 ends as represented by broken line 129 in FIG. 4. After attachment of stiffener 33, the optical end portion 114 is bent upward by 90° and attached to the carrier 30 so that the laminate end portion 115 projects away from the carrier 30 and will extend parallel to the laminate when installed with the retainer. The stiffener 33 serves two purposes, the first being the providing of a hard, flat surface that supports a wirebonding operation. Secondly, at opposite projecting ends of the stiffener are beveled surfaces 35, 35 for engaging slanted or angled wall surfaces of the overmold to mechanically guide the laminate end of the flexible circuit and align its leads with corresponding pads on the laminate.

As shown best in FIGS. 14 and 15, the features for aligning the flex leads with the pads of the terminal pad arrays 60 and 61 are included in the walls of the retainer cavity 58. These features are the slanted wall portions 100 and 102 at opposite sides of the mold cavity and slanted wall portions 104 and 106 on a nose projection 108, which extends into the left end of the cavity 58 and forms pockets 105 and 107 for respectively receiving and aligning the flex 31 of optic receiver 20 and the flex 29 of optic transmitter 22. These slanted wall portions cooperate with the beveled edges 35, 35 at opposite ends of each flex stiffener 33 to initially guide the distal ends of each flex into position and then to maintain that position while the flex leads are wirebonded to the pads of the terminal pad arrays 60 and 61.

Persons skilled in the art, upon learning of the present disclosure, will recognize that various changes and modifications to the elements and steps of the invention are possible without significantly affecting their functions. For example, the improvements described above are equally applicable to separate transmitter and receiver modules. Also, the shapes, sizes and materials of the various components, including the substrate, the overmold frame, the components of the retainer and optic assemblies, the heat sink, and the EMI shield, may be varied widely in accordance with current and future technology for providing the functions of these components and their corresponding systems.

The substrate may be made of a material other than a laminate composite, and may have contacts, pads, chips and/or components other than those shown. Similarly, the overmold frame may have a variety of features other than those shown. The means for sliding the substrate over the mold base and against the dowel pins may comprise edge engaging elements other than a tapered plunger, such as a biased shoe or other element arranged for sliding movement along a track or slot extending in the direction of desired substrate movement. In addition, specific alignment features, such as the mouse bites in the substrate, the slot and trilobe post holes, the angled wall features within the overmold cavity, and the standoff pad arrangements, may each be used independently of the other alignment features. Accordingly, while the preferred embodiments have been shown and described above in detail by way of example, further modifications and embodiments are possible without departing from the scope of the invention as defined by the claims set forth below.

What is claimed is:

1. An overmold assembly comprising an overmold frame molded onto a surface of a substrate and aligned with a feature of said surface:

by said substrate having two concave recesses extending inwardly from a leading edge of the substrate, said concave recesses facing in opposite directions and each having an arcuate wall for engaging a convex arcuate surface on a corresponding one of two alignment features on a mold base when the arcuate wall of each of said recesses is biased into abutment with the arcuate surface of said corresponding alignment feature; and by a radius of curvature of each of said arcuate walls being greater than a radius of curvature of said arcuate surface such that said abutment is along substantially a line of contact between each of said alignment features and the arcuate wall of the corresponding recess to precisely position said substrate on said mold base for receiving said aligned overmold frame.

2. An overmold assembly according to claim 1, wherein said overmold frame includes a platform for supporting a retainer assembly and said platform is provided with a slot hole having opposing sides and with a trilobe hole having three sidewalls defining a triangular shape, wherein said slot hole is arranged to receive a first post on said retainer assembly and said triangular hole is arranged to receive a second post on said retainer assembly, wherein said first post has a cross-sectional size and shape to simultaneously engage each of the opposing sides of said slot hole, and wherein said second post has a size and shape to simultaneously engage each of the three side walls of said trilobe hole.

3. An overmold assembly according to claim 2, wherein said first post engagement provides a first interference fit causing two bands of frictional contact between said first post and said slot hole, wherein said second post engagement provides a second interference fit causing three bands of frictional contact between said second post and said trilobe hole, and wherein said bands of contact provide frictional forces resisting withdrawal of each of said posts from its corresponding hole.

4. An overmold assembly according to claim 2, wherein three standoff pads are provided on said retainer in a triangular pattern and three standoff pads are provided on said platform in a corresponding triangular pattern, and wherein each standoff pad on the platform is arranged to engage and support a corresponding one of said retainer standoff pads to stabilize said retainer assembly when said posts are received fully in said holes, said engaged standoffs providing a gap having a substantially uniform width for receiving an adhesive composition to secure said retainer assembly to said platform.

5. An overmold assembly according to claim 1, wherein said substrate is a laminate board containing electrical conductors connected to electrical contacts at the surface of said board, wherein said overmold frame has at least one wall forming a cavity in which said electrical contacts are exposed, wherein said retainer assembly includes a flexible circuit suspended in said cavity by a carrier, and wherein at least one feature of said cavity cooperates with at least one feature of said flexible circuit to align at least one lead of said flexible circuit with a corresponding one of said electrical contacts.

6. An overmold assembly according to claim 5, wherein said cooperating features comprise at least one beveled surface on said flexible circuit and at least one slanted portion of said cavity wall for engaging said beveled surface to guide and align said flexible circuit.

7. An overmold assembly according to claim 5, wherein said overmold assembly further includes an optical die mounted on said carrier and having an array of contacts; wherein said carrier has an area of contact; wherein said flexible circuit has a plurality of first leads for connection to said area of contact and a plurality of second leads for connection to said array of contacts; wherein a portion of said first leads and a portion of said second leads are carried on a first layer of non-conductive material and covered by a second layer of non-conductive material adhered to said first layer; wherein a first open window is formed through said layers to expose an intermediate portion of said first leads for connection to said area of contact; and wherein end portions of said second leads extend beyond said adhered layers and into a shroud affixed to an end of said adhered layers, said shroud forming a second open window exposing said second leads for connection to said array of contacts while protecting the end portions of said second leads from damage.

8. An overmold assembly comprising:

an overmold frame adhered to an upper surface of a substrate, wherein said overmold frame includes a platform for supporting a retainer assembly and said platform is molded with a slot hole having opposing sides and with a trilobe hole having three sidewalls defining a triangular shape, wherein said slot hole is arranged to receive a first post on said retainer assembly and said triangular hole is arranged to receive a second post on said retainer assembly, wherein said first post has a cross-sectional size and shape to simultaneously engage each of the opposing sides of said slot hole, wherein said second post has a size and shape to simultaneously engage each of the three sidewalls of said trilobe hole, and wherein said second post and said trilobe hole cooperate with each other to provide a communication path which allows a material within said trilobe hole to escape to an area outside of said trilobe hole.

9. An over mold assembly according to claim 8, wherein said first post engagement provides a first interference fit causing two bands of frictional contact between said first post and said slot hole, wherein said second post engagement provides a second interference fit causing three bands of frictional contact between said second post and said trilobe hole, and wherein said bands of contact provide frictional forces resisting withdrawal of each of said posts from its corresponding hole.

10. An overmold assembly according to claim 8, wherein three standoff pads are provided on said retainer in a triangular pattern and three standoff pads are provided on said platform in a triangular pattern, and wherein each standoff pad on the platform is arranged to engage and support a corresponding one of said retainer standoff pads to stabilize said retainer assembly when said posts are received fully in said holes, said engaged standoffs providing a gap having a substantially uniform width for receiving an adhesive composition to secure said retainer assembly to said platform.

11. An overmold assembly according to claim 8, wherein said substrate is a laminate board containing electrical conductors connected to electrical contacts at the surface of said board, wherein said overmold frame has at least one wall forming a cavity in which said electrical contacts are exposed, wherein said retainer assembly includes a flexible circuit suspended in said cavity by a carrier, and wherein at least one feature of said cavity cooperates with at least one feature of said flexible circuit to align at least one lead of said flexible circuit with a corresponding one of said electrical contacts.

12. An overmold assembly, comprising an overmold frame adhered to an upper surface of a substrate, wherein said overmold frame includes a platform for supporting a retainer assembly and said platform is molded with a slot hole having opposing sides and with a trilobe hole having three sidewalls defining a triangular shape, wherein said slot hole is arranged to receive a first post on said retainer assembly and said triangular hole is arranged to receive a second post on said retainer assembly, wherein said first post has a cross-sectional size and shape to simultaneously engage each of the opposing sides of said slot hole, and wherein said second post has a size and shape to simultaneously engage each of the three sidewalls of said trilobe hole, wherein said substrate is a laminate board containing electrical conductors connected to electrical contacts at the surface of said board, wherein said overmold frame has at least one wall forming a cavity in which said electrical contacts are exposed, wherein said retainer assembly includes a flexible circuit suspended in said cavity by a carrier, and wherein at least one feature of said cavity cooperates with at least one feature of said flexible circuit to align at least one lead of said flexible circuit with a corresponding one of said electrical contacts, and wherein said features comprise at least one beveled surface on said flexible circuit and at least one slanted portion of said cavity of said wall for engaging said beveled surface to guide and align said flexible circuit.

* * * * *

UNITED STATES PATENT AND TRADEMARK OFFICE
CERTIFICATE OF CORRECTION

PATENT NO.     : 6,547,452 B1                                          Page 1 of 1
DATED          : April 15, 2003
INVENTOR(S)    : Benson Chan et al.

It is certified that error appears in the above-identified patent and that said Letters Patent is hereby corrected as shown below:

<u>Column 1,</u>
Line 5, please insert the following after the Title:

-- This invention was made with Government support under subcontract B338307 under prime contract W-7405-ENG-48 awarded by the Department of Energy. The Government has certain rights in this invention. --

Signed and Sealed this

Fourth Day of November, 2003

JAMES E. ROGAN
*Director of the United States Patent and Trademark Office*